(No Model.)
C. E. McGLINCHEY.
BICYCLE.
No. 408,845. Patented Aug. 13, 1889.
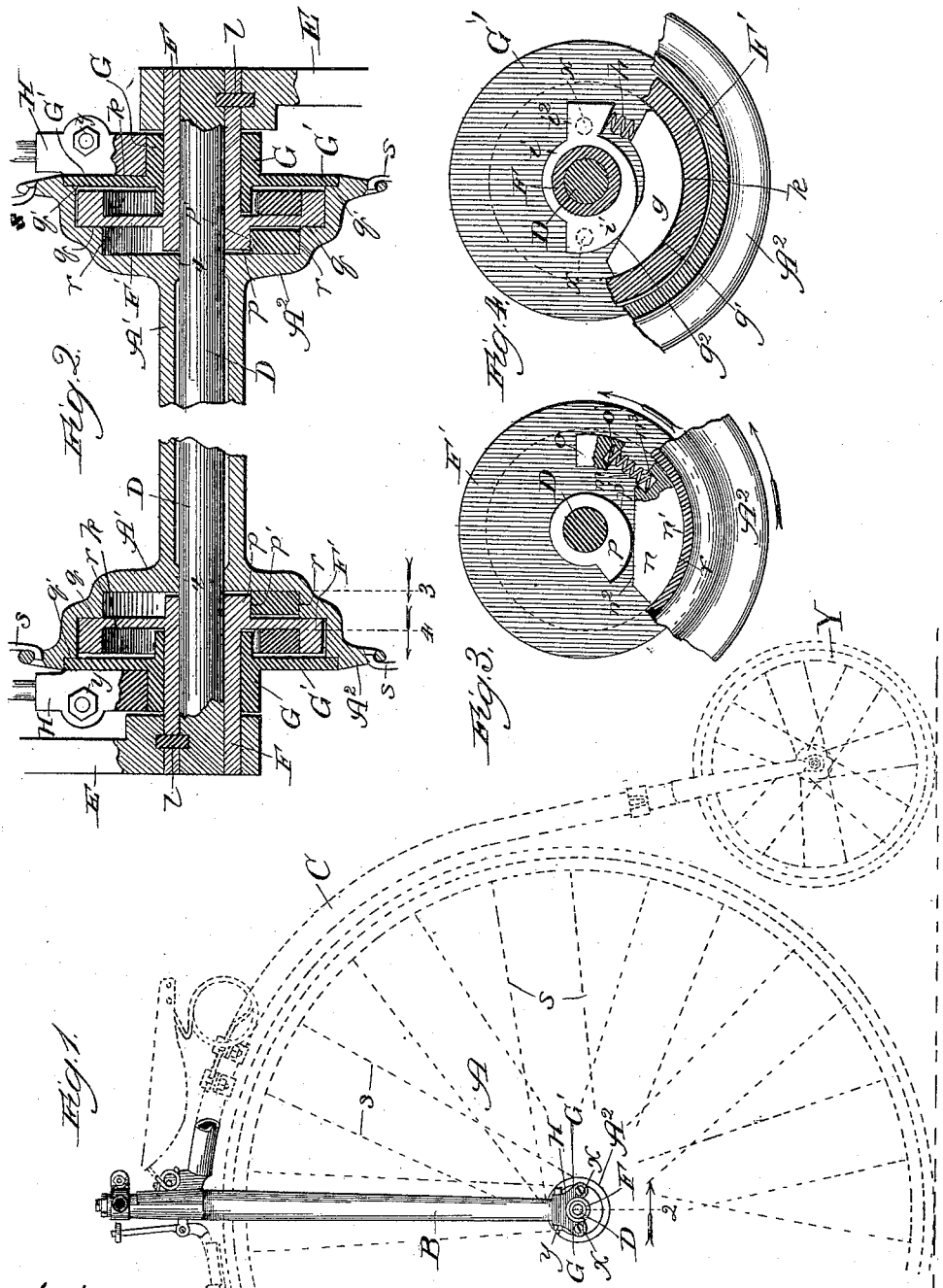
Witnesses
Chas. E. Gaylord,
J. W. Dyrenforth.
Inventor
Charles E. McGlinchey
By Dyrenforth & Dyrenforth,
Atty's

UNITED STATES PATENT OFFICE.

CHARLES E. McGLINCHEY, OF CHICAGO, ILLINOIS, ASSIGNOR OF ONE-HALF TO JOHN W. DILLON, OF SAME PLACE.

BICYCLE.

SPECIFICATION forming part of Letters Patent No. 408,845, dated August 13, 1889.

Application filed May 28, 1889. Serial No. 312,363. (No model.)

*To all whom it may concern:*

Be it known that I, CHARLES E. MCGLINCHEY, a citizen of the United States, residing at Chicago, in the county of Cook and State of Illinois, have invented a new and useful Improvement in Bicycles, of which the following is a specification.

My invention relates to an improvement in the propelling mechanism of bicycles, and is intended to be especially adapted for use with bicycles of the class wherein a large wheel is followed by one of relatively small diameter.

The objects of my invention are, first, to afford propelling mechanism of improved construction for bicycles, whereby the large wheel may be revolved in the positive or forward direction independently of the pedals, and, secondly, to afford, in connection with the running-gear of the large wheel of a bicycle of the particular class above defined, mechanism for lessening the liability to the rider of what is technically denominated a "header."

In the drawings, Figure 1 is a view in broken elevation, mainly in dotted lines, of a bicycle provided with my improvement with the crank and pedal removed; Fig. 2, a broken longitudinal and mainly sectional view of the shaft, hub, and propelling mechanism involving my invention; and Figs. 3 and 4, broken and partly-sectional views taken, respectively, on the lines 3 and 4 of Fig. 2 and viewed in the direction of the arrows.

A is the front wheel, B the front fork, and C the backbone of a bicycle.

A' is the hub of the front wheel, D the shaft, and E E the pedal-cranks. The hub A' comprises a sleeve fitting snugly around the axle at $t\ t$, and which terminates at each end in a housing $A^2$, to which the spokes $s$ of the wheel are secured. Each housing is turned out to produce an inner peripheral surface $r$ and shoulders $q\ q'$, and is designed to receive parts hereinafter described.

F F are sleeves fitting snugly around the shaft D, each carrying toward one end a plate or disk F', which fits against the shoulder $q$ in the housing $A^2$. The face of each disk F' is provided with a central rigid projection or boss $p$, having a cam-shaped edge $p'$, affording a cam, and a rigid stud or boss $o$, having a socket $o'$ in one side, the relative locations of these parts being shown in Fig. 3. Interposed between the cam $p$ and surface $r$ of the housing $A^2$ is a loose wedge-block $n$, having a curved edge $n'$ to fit the surface $r$, a straight edge $n^2$ for the cam $p$ to bear against, and a socket $n^3$ for one end of a helical spring $m$, which extends at its opposite end into the socket $o'$, and is thus confined between the block $n$ and boss $o$. The hub A' is loose upon the shaft D; but the treadles E, sleeves F, and shaft are firmly secured together by keys $l\ l$, so that turning of the treadles in the positive direction turns each disk F' in the same direction (indicated by arrows in Fig. 3) and causes the cam $p$ to bear against the block $n$ and wedge it against the surface $r$ of the hub, causing the block thus to engage the said surface and revolve the wheel A. The opposite face of each disk F' is recessed to afford an inner peripheral surface $k$.

G G are sleeves fitting snugly but loosely over the sleeves F, and provided in each instance with a plate or disk G', which fits against the shoulder $q'$ of the respective housing $A^2$. Each disk G' is provided upon its face (see Fig. 4) with a boss $i$, affording a cam $i'$, and a projection $i^2$, provided with a socket to receive one end of a helical spring $h$, which presses at its opposite end into a socket in a loose wedge-block $g$, which is interposed between the cam $i'$ and surface $k$ of the disk F', which surface surrounds the boss $i$ and block $g$, as shown. The outer edge $g'$ of the block $g$ conforms in shape to the surface $k$, and the block has a straight edge $g^2$ on its inner side for the cam $i'$ to bear against. Upon its opposite face each disk G' carries a socket-piece H, rigidly secured thereto by screws $x$, which, for purposes of strength, extend through the disk and boss $i$. The sockets H are arranged to receive the respective lower ends of the front fork B, which may be secured therein by bolts $y$, as shown in Fig. 1. This construction renders the front fork B, and consequently the backbone C, substantially integral with the sleeve G and its disk G'. A movement in the positive direction of the disk G' and its boss $i$, which would be effected by the rise from the ground of the rear wheel Y of the bicycle, would operate, by the pressure of the block $g$ against the inner peripheral surface $k$ of the disk F', to bind the disks G' and F' together. Movement of the wheel A in the positive direction otherwise than by means of force applied to the pedals will not produce the gripping together of the parts F' and $A^2$, so that the pedals, shaft, sleeve F, and its disk F' would remain unaffected. In like manner movement of the pedals in the positive direction, which rotates the wheel A, produces no gripping effect between the parts F F' and G G'.

The mechanism described is all fitted together with exactness, so that the gripping effect produced of the parts may be practically instantaneous or without appreciable lost motion of the parts primarily moved. The office of the springs $m$ $h$ is to maintain the blocks $n$ and $g$, respectively, in position to perform their functions with the least possible turning against them of the adjacent cams, and the springs are sufficiently elastic to prevent their pressure against the blocks from producing any appreciable binding effect of the latter against the relatively-adjacent inner peripheral surfaces when the cams are not in the condition of bearing against the wedge-blocks.

The effect of the above construction in the use of the bicycle is that, after motion of the wheel A is produced by means of the pedals the rider may rest himself by stopping the motion of the pedals and holding his feet against them, while the inertia of the wheel A will carry it ahead some distance, and in traveling down an inclined surface the pedals may always remain at rest, if desired, and serve to support the feet of the rider. As any sudden movement of the backbone in an upward direction causes the disk G' to bind directly against the disk F', it would have the effect of jarring the pedal which may happen to be in rear of the other, and therefore rising if the pedals are being operated against the sole of the rider's foot, so that further rising of the backbone and rear wheel would be against the force which the weight of the rider would exert upon the pedal; and should the obstruction which the large wheel strikes be one that would tend to stop its forward movement the gripping of the backbone against the shaft would tend to give, momentarily, a new impetus to the wheel, and thus aid in sending it over the obstruction.

The mechanism described, while it operates under all circumstances to lessen the danger of accident, is rendered especially effective when the pedals are at rest, as they may be when traveling down an inclined plane, and when the rider should keep the rear pedal at an angle which would offer the greatest leverage for his weight to operate with should the front wheel strike an obstruction which would tend to lift the rear wheel and produce a header.

While I design my improvement especially for use on bicycles, the gripping mechanism, which is shown as engaging directly with the hub, may be used for the same general purpose as that described in connection with wheels other than the wheels of bicycles, and it may, obviously, be employed in a bicycle independently of the gripping mechanism for preventing rise (or material rise) of the backbone.

The propelling mechanism may be provided at one end of the shaft D only, though it is preferably provided at each end, as shown and described.

What I claim as new, and desire to secure by Letters Patent, is—

1. The combination, with a wheel loosely supported on its shaft, of gripping mechanism comprising a plate F', rigidly secured to the shaft and carrying a wedge-block $n$, yieldingly connected with the plate to have a limited play on the face thereof, and a cam $p$, rigid on a face of the plate and confining the wedge-block against an internal peripheral surface of the wheel and operating by the rotation of the shaft in one direction to wedge the block and rotate the wheel and by the stoppage of the shaft to release its engagement with the wedge-block, substantially as described.

2. The combination, with a wheel loosely supported on its shaft, of a hub A' integral with the wheel and provided with a housing $A^2$, having an internal peripheral surface $r$, a plate F', rigidly secured to the shaft and provided on its face with a rigid cam $p$, surrounded by the surface $r$, a loose wedge-block $n$, interposed between the cam $p$ and surface $r$ and yieldingly held in place by a spring $m$, whereby rotation of the shaft in one direction causes the cam to wedge the block $n$ and rotate the wheel and stoppage of the shaft releases the wheel by disengaging the cam and wedge-block, substantially as described.

3. In a bicycle, the combination, with the wheel A, pedals, front fork, and backbone, of gripping mechanism, substantially as described, between the pedal-crank and wheel, effecting by rotation of the pedal in the positive direction engagement thereof with the wheel to revolve the latter, and effecting by stoppage of the pedal's rotation release of the wheel and gripping mechanism, substantially as described, between the front fork and pedal-crank and actuated by the rise of the backbone to produce engagement between the front fork and pedal-crank, whereby the wheel may revolve in the positive direction while the pedal is at rest, and a rise of the backbone will produce immediate engagement of the pedal-crank, substantially as and for the purpose set forth.

4. In a bicycle, the combination of a wheel A, having a hub A' integral with the wheel and provided with a housing at one or both ends, each housing $A^2$ having an integral peripheral surface $r$, a shaft D, provided with pedals E and on which the wheel is loosely supported, and a sleeve F, surrounding the shaft adjacent to each housing and rigidly secured thereto, and provided with a disk F' in the housing, and having a cam $p$, a loose wedge-block $n$, interposed between the cam $p$ and adjacent surface $r$, and held in place by a spring $m$, whereby rotation of the shaft in one direction engages and rotates the wheel and stoppage of the shaft releases the wheel, substantially as described.

5. In a bicycle, the combination of a wheel A, having a hub A', a shaft D' having rigidly secured thereto the pedals E and on which the wheel is loosely supported, gripping mechanism, substantially as described, on the shaft, and effecting by the rotation of the shaft in the positive direction engagement thereof with the hub $A^2$ and by the stoppag of the rotation of the shaft release of the hub, and gripping mechanism, substantially as described, on the shaft, and with which the front fork is connected, and actuated by a rise of the backbone to produce gripping of the shaft, whereby the wheel may revolve in the positive direction while the pedals are at rest, and a rise of the backbone will effect immediate engagement of the pedal-crank, substantially as and for the purpose set forth.

6. In a bicycle, the combination, with the wheel A, supported on a shaft provided with pedals E, rigidly secured thereto, the backbone C, and front fork B, of a recessed disk F', rigid with the shaft, having an inner peripheral surface $k$, a plate G', to which the front fork is rigidly secured, loosely mounted on the shaft and carrying a wedge-block $g$, yieldingly connected with the plate to have limited play on the face thereof, and a cam $i'$, rigid on a face of the plate and confining the wedge-block against the surface $k$ of the disk and actuated by a turning of the front fork in one direction to grip the disk, substantially as and for the purpose set forth.

7. In a bicycle, the combination, with the wheel A, loosely supported on a shaft D, provided with pedals, of a housing $A^2$, integral with the wheel and having an internal peripheral surface $r$, a disk F' within the housing, rigidly secured to the shaft, recessed on one side to afford an inner peripheral surface $k$ and on its other side provided with a rigid cam $p'$, surrounded by the surface $r$, a loose wedge-block $n$, interposed between the cam $p$ and surface $r$ and held yieldingly by a spring $m$, and a plate G', to which the front fork is rigidly secured, loosely mounted on the shaft, and provided with a rigid cam $i'$, surrounded by the surface $k$ of the disk F', a loose wedge-block $g$, interposed between the cam $i'$ and surface $k$ and yieldingly held by a spring $h$, the whole being constructed and arranged to operate substantially as and for the purpose set forth.

CHARLES E. McGLINCHEY.

In presence of—
J. W. DYRENFORTH,
M. J. BOWERS.